R. F. MacMICHAEL.
INDICATING DEVICE.
APPLICATION FILED JAN. 26, 1917.
1,406,200.
Patented Feb. 14, 1922.
2 SHEETS—SHEET 1.
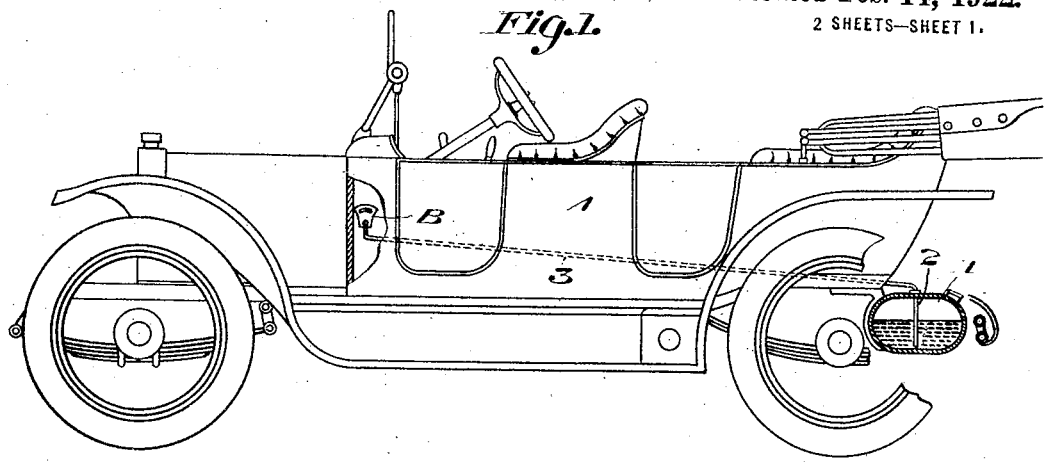
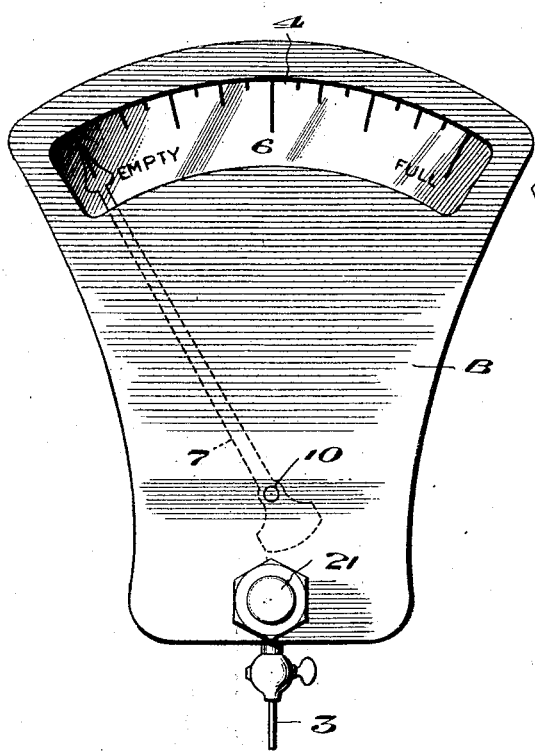
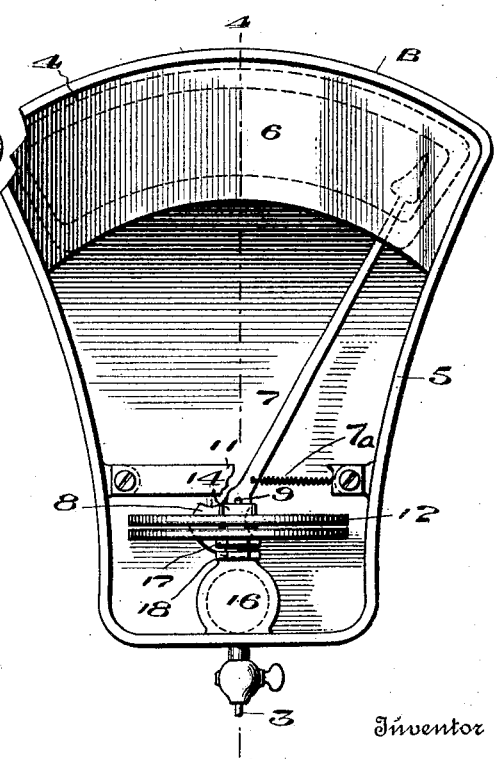
Inventor
Ross F. MacMichael
Witnesses
By K. P. McElroy
Attorney

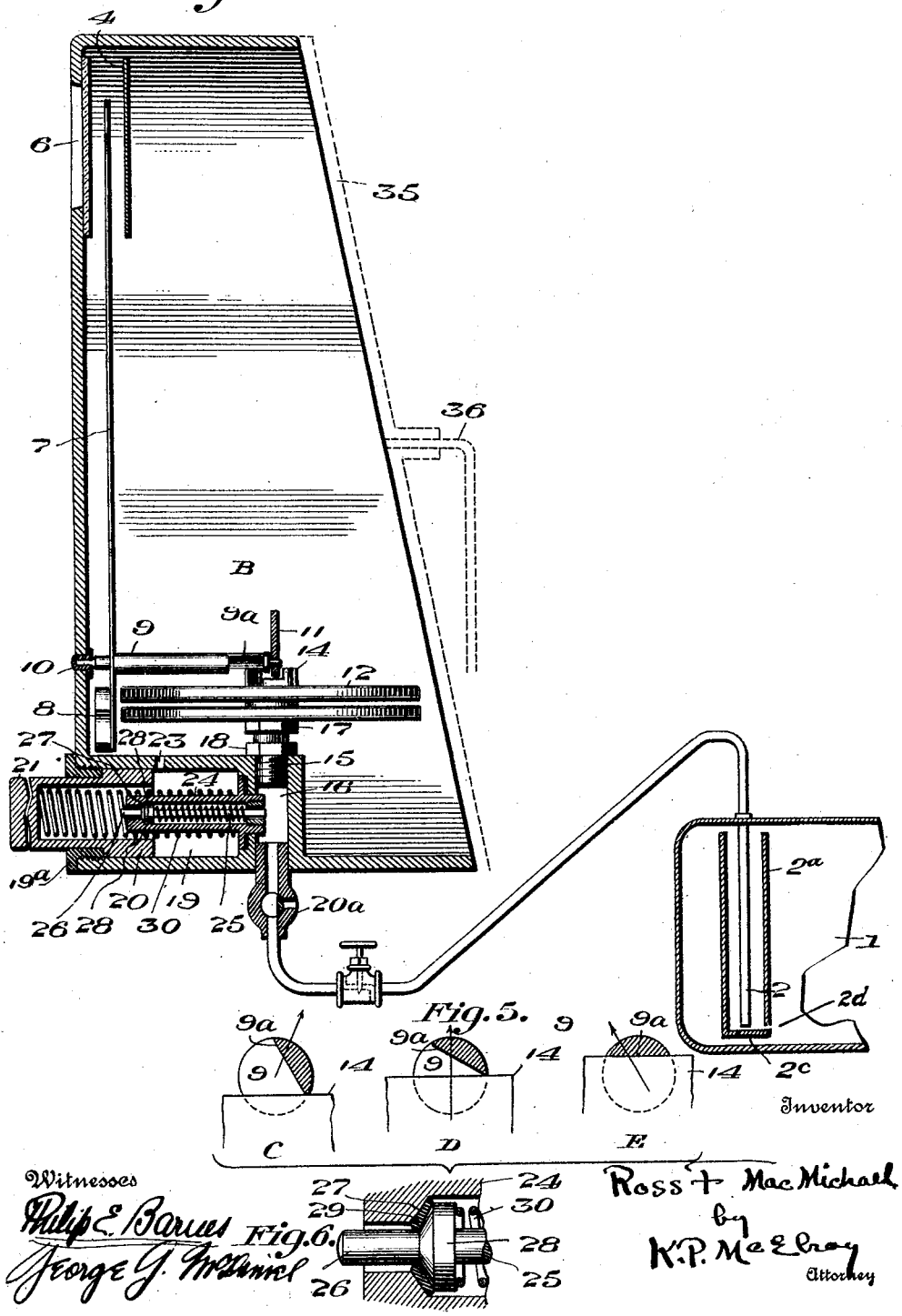

UNITED STATES PATENT OFFICE.

ROSS F. MacMICHAEL, OF PITTSBURGH, PENNSYLVANIA, ASSIGNOR TO THE G. PIEL COMPANY, INC., OF LONG ISLAND CITY, NEW YORK, A CORPORATION OF NEW YORK.

INDICATING DEVICE.

1,406,200.  Specification of Letters Patent.  Patented Feb. 14, 1922.

Application filed January 26, 1917. Serial No. 144,738.

*To all whom it may concern:*

Be it known that I, Ross F. MacMichael, a citizen of the United States, residing at Pittsburgh, in the county of Allegheny and State of Pennsylvania, have invented certain new and useful Improvements in Indicating Devices, of which the following is a specification.

The invention relates in general to a pressure gage, of the class of such instruments which are utilized for indicating hydrostatic heads of liquid depths to be measured by temporarily establishing an air pressure sufficient to balance the hydrostatic head of the liquid body being measured and causing this balancing pressure to react on a suitably graduated indicating mechanism. The invention specifically relates to such a device for indicating the depths of fuel in the tank of a motor vehicle or other body subject to vibratory action and in which it is desired to place the indicator in spaced relation to the tank.

Liquid level indicating devices of this general class now known depend upon the balancing of a liquid column to indicate changes in the liquid level being measured, but obviously such a liquid column if mounted on a vehicle would be subjected to the vibration and surging incidental to the running of the vehicle and any apparent reading of the register would be erroneous, even if it were stable.

Accordingly, one of the objects of the invention is to provide a simple type of indicating instrument of the class described, which will positively and accurately indicate the hydrostatic head of the liquid being measured, and at the same time will be sensitive to any change in the head even under the shaking conditions incidental to a rapid running of the vehicle.

Another object of the invention is to provide a device of this type in the form of a small compact article of manufacture designed to be mounted on the vehicle dashboard and containing relatively few and easily adjustable mechanical parts and with the manual control therefor conveniently accessible to the operator.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

Figure 1 is a view of an automobile provided with a gasoline indicating device under the present invention, the showing being mainly in elevation with certain parts broken away;

Figure 2 is an elevation of a dial and pointer thereon;

Figure 3 is a view of the same partly broken away to show the diaphragm or hollow disk and certain accessory parts;

Figure 4 is a central vertical section along lines 4—4 of Fig. 3;

Figure 5 is a detail view showing a mutilated shaft in three positions;

Figure 6 is an enlarged section of the valve.

In the following description and in the claims, parts will be identified by specific names for convenience of expression but they are intended to be as generic in their application to similar parts as the art will permit.

Referring first to Fig. 1, I have indicated by A an automobile as a whole. This automobile is provided with a gasoline tank 1 of any of the usual types; this tank being arranged, as shown, at the rear of the machine. It may of course be at any convenient point. Into this gasoline tank extends a feed pipe or tube 2 depending from the top almost to the bottom of the tank. Connected to this depending pipe is a communication tube 3 establishing communication with the rest of the indicating device. In practice, this communication tube is of much smaller diameter than the stated depending tube. The depending tube is ordinarily made of about $\frac{1}{4}$th inch internal diameter in order to avoid capillary attraction. As shown in Figure 4 the tube may be inserted in a baffle tube $2^a$ provided with a discharge vent $2^d$ adjacent its bottom $2^c$. Located at any convenient point on the framework of the machine, but best on the dashboard, as shown, is an indicating mechanism designated, as a whole, by B. Referring now to Figs. 2, 3 and 4, this indicating mechanism is shown as composed of a graduated scale or dial plate 4 arranged in a casing 5 provided with a glass or mica plate or window 6. Indicator 7, provided with a balancing weight 8 at its base, and with a retractile spring 7ª is mounted on shaft 9. The front end of this shaft is mounted in a bearing 10 in the front of the gage. Intermediate its end it is provided with a flattened surface, as at 9ª (see Figs. 4 and 5) adapted for engagement with the collar hereinafter described. The rear end of the shaft is mounted in a bearing in a cross piece 11 spanning the casing from side to side. These bearings at the ends of the shaft may be of any usual type, for example, metal bearings or jewel bearings. Below this shaft is located a hollow diaphragm or disk of expansible metal 12, preferably having several chambers of any conventional form. On top of this diaphragm there is shown mounted a collar 14 of metal or the like engaging the edge of the faced portion of the shaft just described. By reference to Fig. 5 this engagement is shown in three different positions in the sub-figures C, D and E. On its under side the diaphragm is provided with a communicating tubular extension 15, the end of which is threaded into air chamber 16. Below the diaphragm is an adjusting key 17. A jam nut 18 is provided for the purpose of locking the diaphragm in the adjusted position. The air chamber communicates at one side with an air pump having cylinder 19 within which plays piston 20. This piston is removable bodily from the cylinder 19 and is held in place by the stop collar 19ª. By means of the keyed portion 17 of the diaphragm, the entire diaphragm with its collar may be adjusted to the proper vertical position. The cylinder walls and piston are preferably ground true to avoid necessity of packing, a slight leakage not being detrimental. The entire pump is self-contained. Air port 23 is opened or closed by the piston head. The valve comprises a casing 24, a valve stem 25 having one end 26 projecting slightly beyond the end of the casing, a valve seat 27 formed in the casing by means of a shoulder and the valve proper 28. This valve 28 may be provided with leather or other suitable packing 29. Spring 30 surrounds the valve stem. In operation when the piston is quickly depressed by means of the thumb or finger, air is entrapped in the cylinder and is compressed. It finds its way through the valve casing 24, thence to the air chamber 16, to the interior of the diaphragms and to the gasoline tank through the communicating tube 3. Ordinarily the pressure of the air in the pump is sufficient to open the valve but if sticking of the valve should occur, it is positively opened by means of the under side of the piston which comes in contact with the projecting end 26 of the valve stem.

In case it is desirable to check the adjustment of the instrument to ascertain that the pointer stands at zero, as it should when there is no gasoline in the tank, an atmospheric bypass is provided which is the equivalent to emptying the tank of gasoline. To accomplish this, the piston 21 is held in its innermost position, thereby opening the valve 28. The slight leakage heretofore referred to past the piston permits the air in the chamber 16, the diaphragms 12 and the tube 3 to escape, the pointer immediately returning to zero position. Two-way valve 20ª may be used for the same purpose.

For any given tank it is of course necessary to preliminarily adjust the indicator 7 in order that it may subsequently correctly indicate the depth of liquid in the tank. The gage shown in Figs. 2, 3, 4 may be set at zero through the operation of the keyed portion 17 and nut 18. This is done under atmospheric pressure, the indicating finger being placed at zero and locked in such position by means of the nut 18. Gasoline is then supplied to the tank and the pump operated to force air through the tube and at least some air through the gasoline in order that the head of gasoline in the tank may operate to exert its pressure upon the entrapped air in the tube 3. As the quantity of gasoline diminishes in the tank and its level becomes lower it exerts gradually lessening pressure upon the entrapped air in the tube 3, part of which air escapes from time to time. This entrapped or sealed air however is exerting its pressure upon the diaphragms and they in turn, through the mechanism described, operate the pointer to indicate the pressure which may be read in terms of depth or quantity upon the gage dial.

The device hereinbefore described has the advantage that it may be used in connection with the ordinary gravity or vacuum feed gasoline tanks now usually employed. However in event the invention is to be applied to the pressure feed gasoline tanks occasionally used, it is necessary that the pressure in the gasoline tank and the pressure around the diaphragms be the same. To accomplish this with the device shown, I provide an air tight casing B by the employment of a cover 35. The casing is placed in communication with the gasoline tank through means of the tube 36 leading from such casing to a point above the level of the gasoline in the tank.

Among the main advantages of my invention are the arrangement which permit accurate zero setting, the self-balancing of the mechanical parts, and the elimination of friction, such as would ordinarily result from the employment of levers, gears and the like. One of the important advantages resulting from this invention is the possibility of accurate determination of the quantity of liquid in the tank because of the employment of the damping devices described. The damping means of the devices shown in Figure 1 may reside in the character of the tubes employed or the mechanical elements hereinbefore referred to, while the damping means of the device shown in Figure 4 resides in the employment of a tube for forming a tortuous liquid passageway in the tank 1.

The details of construction afford many mechanical advantages. For instance, with reference to the shaft 9 with its flattened surface 9$^a$, the vertical movement and corresponding angular rotation of the shaft is very much in excess of the horizontal sliding of the contact point, thus giving an exceedingly low coefficient of friction in this mechanism. Likewise, the flattened surface 9$^a$ in conjunction with its bearing and the crosspiece 11 forms a positive stop limiting the upward movement of the diaphragm 12, thereby preventing straining of the diaphragm due to an excess of pressure from any unusual cause, as shown diagrammatically at E in Fig. 5. It is also to be noted that as the collar 14 is concentric with the screw 15, vertical adjustment of the diaphragm and collar by means of the screw does not affect the longitudinal relation of this collar to this shaft 9.

What I claim is:—

1. In a liquid depth indicator device a pressure gage comprising an expansible diaphragm, means for exerting pressure on the diaphragm, a collar on the diaphragm, a shaft provided with a flattened portion intermediate its ends, one edge of the flattened portion resting upon the collar and adapted to be turned thereby upon expansion of the diaphragm, and indicating means operated by the shaft.

2. In a pressure indicator an expansible diaphragm carrying a vertical collar, a horizontal shaft journaled in proximity to the collar and having a flattened portion intermediate its ends, one edge of the flattened portion engaging the collar and rotated thereby upon vertical movement of the diaphragm, and a pointer operable by the shaft.

3. In a pressure indicator a casing, a pressure chamber within said casing, a diaphragm, a pipe establishing communication between the diaphragm and the pressure chamber, and having screw engagement with said chamber for adjusting the diaphragm with respect to such chamber, and a nut on said pipe for locking the diaphragm in adjusted position.

4. An article of manufacture including a mechanism containing casing provided with a pressure indicating mechanism, a pressure actuated device including a diaphragm operatively connected therewith, a pump barrel casting for supporting said pressure actuated device and provided at one end with a compartment constituting an air inlet to said pressure actuated device and a manually actuated pressure generating means slidably mounted in said pump barrel casting and in fluid communication with said inlet.

5. An article of manufacture including a containing casing, a pressure indicating mechanism provided with an actuated member, an expansible member bearing on said actuated member to cause the mechanism to function, a three way conduit with one of its ways opening through a side of the casing and provided with means for connecting a conduit therewith adapted to lead to the head to be measured, another way open to said expansible member to actuate the same, and a manually actuated pump housed within said casing and open to the third way of said conduit.

6. An article of manufacture including a pressure indicating mechanism provided with an actuated member, of an expansible member bearing on said actuated member to cause the mechanism to function, a three way conduit with one of its ways adapted to lead to the head to be measured, another way open to said expansible member to actuate the same, and the third way open to a source of pressure relatively high compared to the head to be measured, means for creating said high pressure and adjustable means for varying the relative position of the actuated member and the part of the expansible member engaging the same.

7. In a device of the class described, the combination of a support, an indicating pointer carried by said support and provided with a bearing surface, an expansible member positioned to one side of the pointer and adapted to engage said bearing surface when expanding and thus operatively connected thereto to cause the same to function, means for placing said expansible member in fluid communication with a static head to be measured and a manually actuated pressure generator contained within said support for establishing a pressure in said expansible member and in said means.

8. In a device of the class described, the combination of an indicating mechanism including a shaft mounted for rotary movement about a fixed axis and provided with a flattened portion, means operatively connected to said shaft to hold the flattened portion in preset position, a pressure actuated member mounted to have a shaft rotating movement in a direction at an angle to the preset position of said flattened portion and adapted to bear on the same to rotate the shaft about its axis.

9. In a device of the class described, the combination of an indicating mechanism including a shaft mounted for rotary movement about a fixed axis, means for moving the shaft in one direction, a pressure actuated member constituting a stop for the shaft, and a connection between said stop and shaft for limiting the movement of the shaft under the action of said pressure actuated member.

10. In a device of the class described, the combination with an indicating mechanism including a pointer, of a pressure actuated device operatively connected to said mechanism to actuate the pointer, means acting on the pointer to move the same into bearing engagement with said device and to hold the same against vibratory movement and means for conveying the pressure of the static head to said device.

11. In a device of the class described, the combination with an indicating mechanism including a pointer and an extension therefrom having a bearing surface, of a pressure actuated device operatively connected to bear on said surface to actuate the pointer, said surface and pressure actuated device coacting to limit the movement of the pointer in its pressure indicating direction, means acting on the pointer to hold the same in its bearing engagement with said device, means for conveying actuating fluid pressure to said pressure actuated device and means for damping variations in the transmission of pressure induced by any surging action of the actuating fluid.

12. In a device of the class described, the combination with a pressure indicating mechanism, of a pressure actuated device operatively connected therewith, said device provided with an inlet for admitting fluid under pressure thereto, manually actuated means for creating a pressure at said inlet and a manually actuated relief valve constituting a part of said pressure creating means for causing a reduction of pressure in said pressure actuating device, said relief valve being positioned relative to the pressure creating means to permit the opening of the relief valve by a movement of said means into an extreme position.

13. In a device of the class described, the combination of a support, a scale carried thereby, an indicator having a fixed axis of rotation and coacting with said scale to indicate static heads, a pressure actuated device carried by the support open to the pressure of the head to be measured positioned to one side of and operatively connected with the indicator to actuate the same, and means for bodily adjusting the pressure actuated device relative to the indicator and to the support whereby the indicator may be set relative to its scale.

14. In a device of the class described, the combination of a support, a scale carried thereby, an indicator having a fixed axis of rotation and coacting with said scale to indicate static heads, a pressure actuated device carried by the support and open to the pressure of the head to be measured and having a member movable lineally in its actuating movement, means for translating the linear movement of said member into rotary movement of said indicator about said axis and adjustable means for resetting the position of said device relative to said axis of rotation.

15. In a device of the class described, the combination of a support, a scale carried thereby, an indicator having a fixed axis of rotation and coacting with said scale to indicate static heads, a pressure actuated device carried by the support and open to the pressure of the head to be measured and having a member movable lineally in its actuating movement, means for translating the linear movement of said member into rotary movement of said indicator about said axis and said translating means including a flat stop surface for limiting the movement of said movable member in its pressure actuated direction.

16. An article of manufacture including a mechanism containing casing provided with a scale visible from the front thereof, an indicating mechanism including a pointer coacting with said scale to indicate static heads to be measured, an expansible member operatively connected to said indicating mechanism, a pressure generating device for establishing a head balancing pressure in said member, said device including a manually actuated element projecting from the casing in juxtaposition to said scale and accessible to the operator viewing the scale whereby the scale may be read conveniently while actuating said projecting element.

17. A device of the class described comprising an air tight mechanism containing casing, a mechanism supporting member provided with a compressed air space, an indicating mechanism mounted within the casing, a pressure actuated mechanism exposed to the pressure conditions in said casing, operatively connected to said indicator mechanism and open to said air space, a manually actuated air compressing pump having its intake opening from the interior of said casing and its discharge port opening into said compressed air space and pressure conducting means open to said casing.

In testimony whereof, I affix my signature.

ROSS F. MacMICHAEL